Feb. 9, 1965  F. K. E. JOHANSSON  3,169,160
MEANS FOR PROTECTING THE NOSE OF ROTARY FURNACES
Filed Oct. 25, 1961
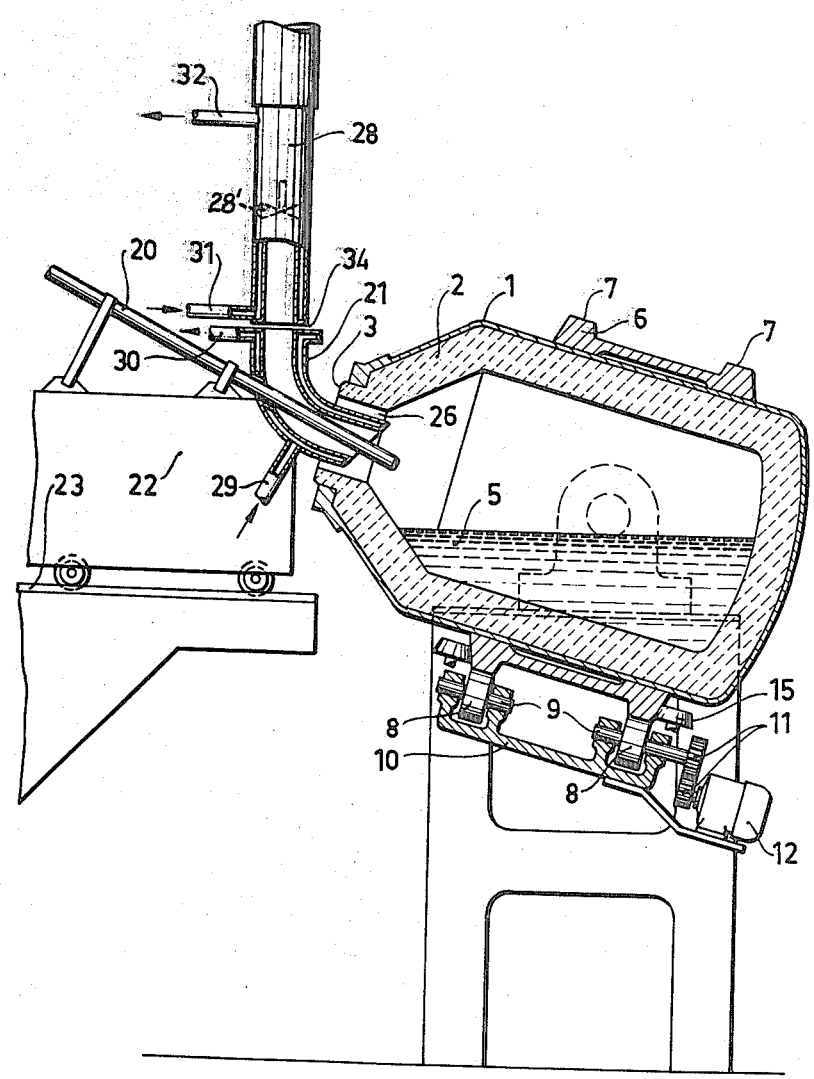
Inventor:
Falke Karl Evald Johansson,
By Pierce, Scheffler & Parker
his Attorneys

United States Patent Office 3,169,160
Patented Feb. 9, 1965

3,169,160
MEANS FOR PROTECTING THE NOSE OF
ROTARY FURNACES
Folke Karl Evald Johansson, Hallsjogarden, Borlange,
Sweden, assignor to Stora Kopparbergs Bergslags Aktiebolag, Falun, Sweden, a company of Sweden
Filed Oct. 25, 1961, Ser. No. 147,500
Claims priority, application Sweden, Oct. 28, 1960,
10,408/60
6 Claims. (Cl. 266—36)

The present invention relates to melting furnaces and more particularly to rotary furnaces of the type having a central opening in one of its end walls. It is especially concerned with means for protecting the inside walls of furnace openings.

Rotary furnaces have in recent years attained an ever increasing use for refining pig iron to steel and an apparent reason therefore is the improvement of the process obtained by using a blow-gas of high oxygen content for the refining. At the combustion of the carbon monoxide formed in the refining process and escaping from the bath by a blow-gas rich in oxygen, especially commercial oxygen gas, above the bath a very high temperature is obtained in the furnace atmosphere and thus also in the exhaust gases, which usually escape through said central opening. In addition considerable heat is usually developed at the surface of the bath where the gas jet impinges the bath, giving rise to strong radiation heat which may cause severe attacks on the furnace lining. One of the advantages obtained by rotating the furnace is that the lining heated by the furnace atmosphere, and possibly by radiation from the bath, is cooled by the molten metal when the lining is brought below the surface of the melt at the rotation of the furnace. This contributes to the fact that a very good heat economy is obtained in the refining process carried out in rotary furnaces, since the carbon content of the pig iron may be substantially fully burnt to $CO_2$ and the heat thereby released may be made full use of directly in the furnace for smelting large amounts of scrap, for reduction of iron ore and for raising the temperature of the melt.

It has, however, turned out that, especially in large furnaces, the walls of the central opening may be damaged by the high exhaust gas temperature, especially if the lining of the walls takes up iron oxide, in the form of dust and spits, inasmuch as a melting of the lining may then take place. This cannot be avoided by charging so much into the furnace that the melt in position of repose reaches the rim of the opening, because in that case over-cooking should occur at the violent decarburization taking place in the metal.

In order to obtain effective cooling of the lining in the opening of the furnace, water cooling has previously been tried. For this purpose, in the present type of furnace, there is required a complicated connection of inlet and outlet for water to a cooling box embedded in the lining. Moreover, in the use of such cooling in a lining consisting of dolomite or magnesite there is a risk, should a leakage appear therein, that destruction of the lining adjacent to the cooling box would not be noticed in time, which could have serious consequences.

It is also possible in known manner to cool the opening with water from exterior water nozzles but it is then difficult to avoid steam generation, corrosion and other disadvantages arising from the wetting. The opening instead could be cooled, it is true, by air blown against it or supplied thereto at a high rate through a slit arranged around it, but this obvious solution as a rule gives no sufficient cooling.

According to the present invention, a more positive protection of the furnace opening is obtained by providing a baffle or shield in the opening. This shield should be cooled, which result is suitably attained by making it hollow and passing a liquid, water for instance, through it. For this purpose the shield may be jacketed or consist of a coil of piping. The shield which may protect the entire circumference of the opening or a part thereof is inserted to such a depth into the opening that is required for the protection thereof against overheating. A rotary furnace is usually equipped with an exhaust gas tube attached to the furnace opening by a hood, and in such a case it is especially suitable to provide the lower part of the exhaust gas hood with a cooled, preferably cylindric tube attachment which is inserted into the opening of the furnace. The lining may thus be sheltered from radiation from the (exhaust) gas and from the bath at the same time as it is cooled by radiation from itself against the cooled surface of the shield.

Due to the fact that the opening of the furnace is not always quite cylindric, as it may, for example, be covered with slag which has caked in the opening at the tapping of slag or steel, a free slit between the opening and the cylindric shield is required.

A very effective cooling is obtained if the shield is made tubular, cylindric for example, and so dimensioned as to create a slit between itself and the opening and the ambient air, for instance is caused to pass from outside through the slit into the furnace and possibly directly into the tubular shield, which is then suitably attached to the exhaust piping where a suction takes place. This air may be required for the combustion of carbon oxide possibly still present in the gases, or as diluting air for lowering the temperature of the exhaust gases. Alternatively, a part of this air may be admitted to the exhaust gases through a separate air intake outside the furnace, but even in a case where only a very small part of the dilution air passes through the slit the shield or tube produces a protecting effect by intercepting radiation from the hot exhaust gas.

The invention will now be described with reference to an embodiment illustrated in the accompanying drawing, which is adapted to a rotary furnace for the refining process mentioned above, but it is to be understood that the invention may also be employed for other furnaces for protection or cooling of the furnace opening.

In the drawing 1 designates a rotary furnace provided with a lining 2, the portion of which situated in the furnace opening 3 is to be protected according to the invention, against the high temperature prevailing above the molten bath 5. The furnace has a gridle 6 with treads 7 running on rollers 8 mounted on shafts 9 in a frame 10. One of these shafts is driven over gearing 11 by motor 12 effecting the rotation of the furnace 1. Guide rollers 15 are provided for keeping the furnace resting on the rollers 8.

The refining by oxidation of the carbon content of the iron melt in bath 5 is carried out with oxygen supplied through the water cooled oxygen twyer 20, which is mounted together with the exhaust hood 21 for the waste gases, on a carriage 22 movable on tracks 23 so as to make feasible their removal from the furnace opening to enable charging slag tapping, sampling etc. There is a free slit 26 between the lining 2 of opening 3 and the hood 21 when the latter is in operating position. In this position the flue 28 constitutes an extension of the hood. The flue is connected with a fan 28' producing a partial vacuum or suction in the hood 21. The hood 21 is jacketed and water cooled, the water being introduced through nipple 29 and removed through nipple 30. Similarly the lower portion of the flue 28 is jacketed and cooled by water introduced through nipple 31 and leaving through nipple 32. It is, of course, possible, alternatively or additionally, to cool the hood 21 by a closely coiled pipe in which water is circulated. Between the lower end of flue 28 and the upper end of hood 21 there is an air slit 34, the height of which may be controlled, whereby the partial vacuum in the hood 21 may be so adjusted, that the fan besides the waste gases from the furnace sucks in a certain amount of air through the slit 26 which then cools the lining in the opening 3. In the extreme case slit 34 may be entirely closed and then maximum amount of cooling air is sucked in through slit 26.

As indicated above the hood as well as flue are provided with water jackets to resist the high temperature. In order to obtain further cooling it is possible to embed coolant coils, which may be arranged in the same way as in a steam boiler. Instead of being attached to a carriage together with the oxygen twyer 20 the hood 21 may be attached to a turnable bracket, by means of which it may be turned into the furnace opening 3.

As indicated in the drawing the lower end of hood 21 is cut off obliquely so that the upper part of it projects farther into the opening of the furnace than the lower part of it, thereby shielding a greater part of the upper portion of the opening than the lower and leaving space at the lower portion to foaming melt (slag) which may bulge up.

What is claimed is:

1. In a rotary furnace of the inclined type provided with an internally lined exhaust opening in one end wall and a tuyere inserted into said furnace for blowing in refining gas rich in oxygen, means different from said tuyere for protecting the lining of said exhaust opening comprising a shield inserted in said opening, there being provided a space between the shield and the lining of the exhaust opening, and means for sucking ambient atmosphere through said space, so as to shield off during at least a part of each revolution of the furnace the lining of said opening from at least the major part of the exhaust gases passing through said opening as well as from heat radiation from the surface of the melt in the furnace.

2. Means as claimed in claim 1, in which the shield is a part of a flue through which the furnace gases are sucked out of the furnace.

3. Means as claimed in claim 2, in which said shield being a part of the flue forms a wide tube inserted in the exhaust opening with a clearance from the lining of said exhaust opening.

4. Means as claimed in claim 3, in which evacuating means are provided in said flue of a capacity to give a pressure differential between the ambient atmosphere and the space of the furnace where said tube opens so as to cause a suction from said ambient atmosphere through said clearance into said tube.

5. Means as claimed in claim 4 comprising in said flue an air intake located outside the furnace opening to form a shortcut for air propelled by said evacuating means, the intake being adjusable so that said suction through said clearance can be controlled.

6. Means as claimed in claim 1, in which said shield is water-cooled.

References Cited by the Examiner
UNITED STATES PATENTS

| 2,598,393 | 5/52 | Kalling et al. | 266—36 X |
| 2,902,358 | 9/59 | Kalling et al. | 266—36 X |
| 2,930,688 | 3/60 | Kalling et al. | 266—36 X |
| 3,002,739 | 10/61 | Lawler | 266—35 |
| 3,058,823 | 10/61 | Churcher | 75—60 |

FOREIGN PATENTS

| 584,411 | 2/25 | France. |
| 839,282 | 6/60 | England. |

MORRIS O. WOLK, Primary Examiner.

MARCUS U. LYONS, JAMES H. TAYMAN, Jr., Examiners.